July 30, 1940.  G. S. LEWIS  2,209,572
COMPRESSION BRAZING FOR JOINING METAL TUBES
Filed Jan. 14, 1938
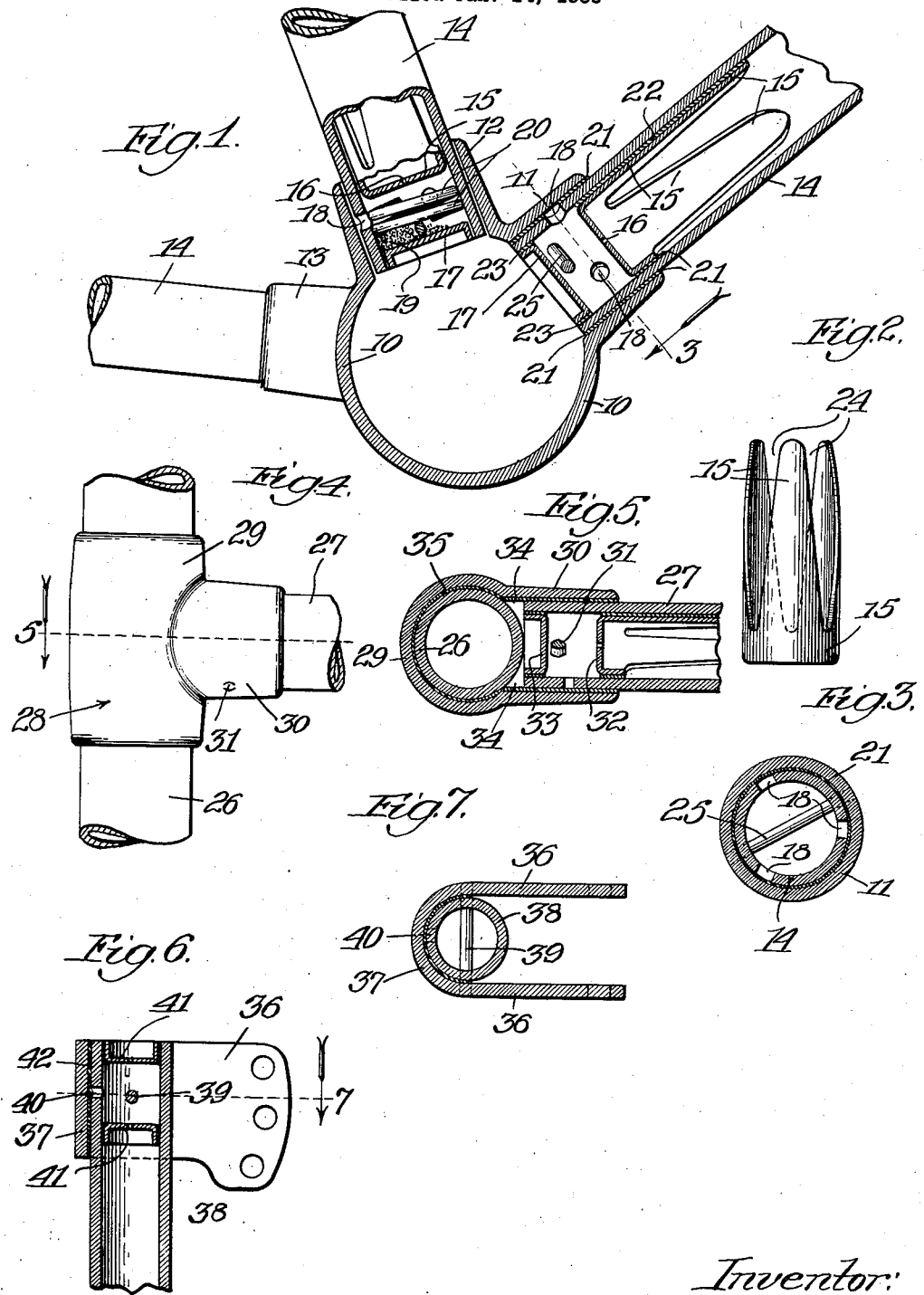
Inventor:
George S. Lewis,
By Chritton, Wiles, Davies, Hirschl & Dawson,
Attys.

Patented July 30, 1940

2,209,572

UNITED STATES PATENT OFFICE 2,209,572

COMPRESSION BRAZING FOR JOINING METAL TUBES

George S. Lewis, Evanston, Ill.

Application January 14, 1938, Serial No. 185,062

2 Claims. (Cl. 113—112)

This invention relates to compression brazing for joining metal tubes.

An object of the invention is to provide a simple method and means for effectively joining metal tubes whether in straight overlapping position or at different desired angles. A further object is to provide new means by which a connecting spelter is caused to flow between overlapping metal surfaces to connect the same. A further object is to provide stop members in connection with metal parts to be joined whereby pressure may be generated to cause the spelter to flow between the metal surfaces, some of the stop members serving also as reinforcing elements for the joints. A further object is to provide an improved flux for use with a spelter whereby rapid and effective joining of metal surfaces is accomplished. A still further object is to provide improved metal joints which are capable of withstanding severe strain and which are formed by a simple and inexpensive method. Other objects and advantages will appear as the specification proceeds.

The invention is illustrated, in preferred embodiments, by the accompanying drawing, in which—

Figure 1 is a broken sectional view illustrating the connecting of metal tubes; Fig. 2, a plan view of a fish-mouth connecting stop; Fig. 3, a transverse sectional view, the section being taken as indicated at line 3 of Fig. 1; Fig. 4, a plan view of connecting means for tubes illustrating another type of connection for which the invention is adapted; Fig. 5, a sectional view, the section being taken as indicated at line 5 of Fig. 4; Fig. 6, a sectional view of a modified form of connection to which the invention is adapted; and Fig. 7, a transverse sectional view, the section being taken as indicated at line 7 of Fig. 6.

In the illustration given in Figs. 1, 2 and 3, a central tube 10 is provided with integral tubular extensions 11, 12 and 13. Tubes 14 extend into each of the tubular extensions. The tube 14 extending into the tubular extension 12 is shown in a position prior to the connecting of the parts by the spelter. In other words, this structure illustrates the parts before the spelter is melted and the parts are connected. The tube 14 extending into the tubular connection 11 illustrates the parts after the molten metal has united them.

Referring to the structure within the tubular extension 12, it will be observed that the tube 14 is provided on its interior with a fish-mouth stop 15 having a small perforation 16 in its innermost wall, and also with a second stop 17 which is illustrated as not perforated. The overlapping portion of the tube 14 is provided in its interior with a series of apertures 18 through which the molten metal may later flow. Within the chamber formed by the stops 15 and 17 is placed the flux 19 and the coiled brass ring or wire 20.

After the structure just described is placed within a heating furnace as, for example, a muffle furnace, the spelter and flux fuse and develop a pressure within the chamber and cause the metal to flow through the apertures 18 into the space 21 between the parts 11 and 14, thus forming a uniform and sturdy bond between the two parts.

It will be observed that the fish-mouth stop 15 overlaps the integral tubular extension 11 and serves as a reinforcement for the joined portion. The metal forms a layer 22 between the outer surfaces of the fish-mouth stop 15 and the inner wall of the tube 14. Also, a similar bond 23 is formed between the stop 17 and the inner wall of tube 14. Thus, in the completed structure, the metal bonds the members 14 and 11 while at the same time firmly uniting the stop members in the interior of the tube to the tube 14 to reinforce the tube at the critical joint portions.

The fish-mouth stop 15 is preferably provided with spring finger portions 24 which are flared outwardly so as to adapt the stop to fit the tubing which is often oversize or undersize. By having the opening 16 on the inner side of the tube rather than in the outer stop 17, there is no opportunity for solutions which may be used in treating the completed product before painting, etc., from entering the tube 14 where it could be removed only with considerable difficulty. In the finished product, the structure can be dipped, as for pickling or washing or painting, and the solution is prevented by the member 17 from entering the tube 14 entirely. At the same time, any excess pressure within the chamber can be freed through the opening 16 into the inside of the tube 14.

In the event the tube 14, as just described, is joined at both ends so that the pressure extends into the interior of the tube, I prefer to vent the tube with a small drill hole somewhere near the center of the tube where the strain is least. Then after the connecting operation, the hole is closed and the piece can then be immersed in the solution and treated as desired.

Prior to the heating operation, I prefer to pin the parts in the position illustrated in Fig. 1 with respect to the tubular extension 12 by passing a pin 25 through the members 12 and 14. By this means, the parts are held in a fixed relative position during the succeeding operations.

In the form of union shown in Figs. 4 and 5, the tubes 26 and 27 are connected by a T fitting 28. The fitting 28 is provided with a collar 29 receiving the tube 26, and also with a tubular extension 30 receiving the tube 27. A pin 31 is passed through the parts 27 and 30 to maintain them in the desired relative position. The fish-mouth stop 32 is placed within the tube 27 in the position shown in Fig. 5. Also a second stop 33 is placed on the inside thereof adjacent the tube 26. If desired, the stop 33 adjacent tube 26 may be omitted or, if it is used, spelter and flux may also be placed within the space 34 as well as between the two stops. The heating causes the molten metal to pass between the stops and the tube 27, and also between the tube 27 and the tubular extension 30, and as also is shown more clearly in Fig. 5, the molten metal forms a layer 35 between the collar 29 and the tube 26.

No effort is made herein to set forth reasons or theories for the flow of the metal. It is found that the metal flows readily and quickly between the connecting surfaces and forms a uniform layer. At the same time, the metal stops flow abruptly when it reaches an outer surface exposed to the air. It may be that the uniform flow is produced by a capillary attraction or by some effect produced by the adjacent relation of the surfaces to be connected. At any rate, an extremely strong joint is produced with the metal lying in a layer which is substantially uniform throughout between the surfaces, no matter whether the surfaces are adjacent the chamber in which the spelter and flux were fused or quite far removed therefrom.

In the structure shown in Figs. 6 and 7, the flange member 36 is provided with a curved surface 37 lying against the tube 38. The tube 38 is pinned within the curved portion 37 by the pin 39, and the tube is provided with an aperture 40 lying adjacent the curved portion 37. Stops 41 are introduced within the tube 38, as shown more clearly in Fig. 6, each of the tubes being shown with tiny perforations. The spelter and flux are placed within the chamber before one of the stops is placed in position to close the chamber, and the unit is heated within a furnace or otherwise heated to fuse the spelter and flux. The molten metal flows through aperture 40 between the metal surfaces to form a uniform bond 42.

The application of the invention can be, if desired, further extended to include a great mass of connections between tubes and parts of various shapes and types. The tubes may be connected in a straight joint or in any desired angle. The joints illustrated are given merely as examples, it being obvious that the invention is likewise applicable to a large number of structures. It will be observed that where one of the tubes is brought against a wall provided by another tube, only one stop is required to form the chamber since the wall of the other tube provides the other stop. In carrying out the invention, it is only necessary that a substantially closed chamber be provided, one of the walls being perforated or weakened so as to permit the escape of an excess of gas if the pressure becomes excessive. Under the influence of the pressure and the capillary attraction of the space, or because of other reasons not herein stated, the metal flows readily and evenly between the surfaces to provide a uniform bond therebetween.

Any desired or satisfactory spelter may be employed. Commercial lump spelter or flat strips of metal suitable for brazing may be used. However, I have found that a coiled wire of proper brazing metal is best suited for the purpose. The wire is preferably coiled so that the outside diameter thereof is approximately the same as the inside diameter of the tube. When heat is applied, the heated coil of spelter is caused to expand, thereby maintaining a position in contact with the inside wall of the tube. By being in direct contact with the heated tube, the heat is instantly transmitted to the coil of spelter, thereby causing it to fuse more quickly than if the spelter were lying loose in the enclosed chamber. At the same time, the wire is more exposed to the surface along which it is to flow so as to reach the surfaces to be joined.

The spelter may be of any suitable material. I have found that a high brass spelter is very satisfactory. For example, I have used with good results a spelter consisting of 65 per cent of copper and 35 per cent of zinc. However, the composition may vary considerably.

In obtaining the rapid and uniform layers just described, I find that the composition of the flux is quite important. I have discovered that by combining with powdered boracic acid, a lubricant such as, for example, petrolatum, much more satisfactory results are obtained, the layer being found to be considerably more uniform. Instead of petrolatum, lard oil or any other suitable lubricant may be employed. The following is given as an example of the flux:

| | Parts by volume |
|---|---|
| Powdered boracic acid | 6 |
| Petrolatum (high grade—snow white) | 3 |

In addition to the introduction of the lubricant within the chamber as a part of the flux, I find that best results can be obtained by greasing the outside of the parts to be united by the lubricant, the lubricant causing the molten metal to flow more readily between the surfaces to unite them.

While in the foregoing description, I have set forth certain steps and certain parts as illustrative of the invention, it will be understood that these may be varied widely by anyone skilled in the art without departing from the spirit of my invention. The foregoing detailed description has been given for clearness of understanding only, and no unnecessary limitations should be understood therefrom, but the appended claims should be construed as broadly as permissible, in view of the prior art.

I claim:

1. In a method for connecting a metal tube to a tubular extension of a metal part, the steps of bringing the extension into overlapping relation with the tube, introducing into the overlapped portion of the tube an elongated fish-mouth reinforcing stop member of a length greater than the diameter of the tube, said stop member having a vent in its wall communicating with the interior of said tube, to provide a pressure chamber substantially closed except for the pressure release vent in said stop, said chamber communicating with the space between said tubular parts and the space between the stop member and the tube, inserting a pin in said parts to retain them in fixed position, introducing spelter and flux within said chamber, and heating the same to cause the metal to flow between the tubular parts and between the stop member and said tube to form a reinforced joint.

2. In a method for connecting a metal tube to a tubular extension of a metal part, the steps of bringing the extension into overlapping relation with the tube, introducing into the overlapped portion of the tube an elongated fishmouth reinforcing stop member of a length greater than the diameter of the tube, a second stop member spaced from said first-mentioned stop member, at least one of said stop members being provided with a vent in its wall, said stop members providing between them a pressure chamber substantially closed except for the pressure release vent in said stop, said chamber communicating with the space between said tubular parts and the space between said first-mentioned stop member and the tube, inserting a pin in said parts to retain them in fixed position, introducing spelter and flux within said chamber, and heating the same to cause the metal to flow between the tubular parts and between the first-mentioned stop member and said tube to form a reinforced joint.

GEORGE S. LEWIS.